(No Model.)
O. B. ROSS.
AUTOMATIC MEASURER FOR CREAMERIES.
No. 574,275. Patented Dec. 29, 1896.
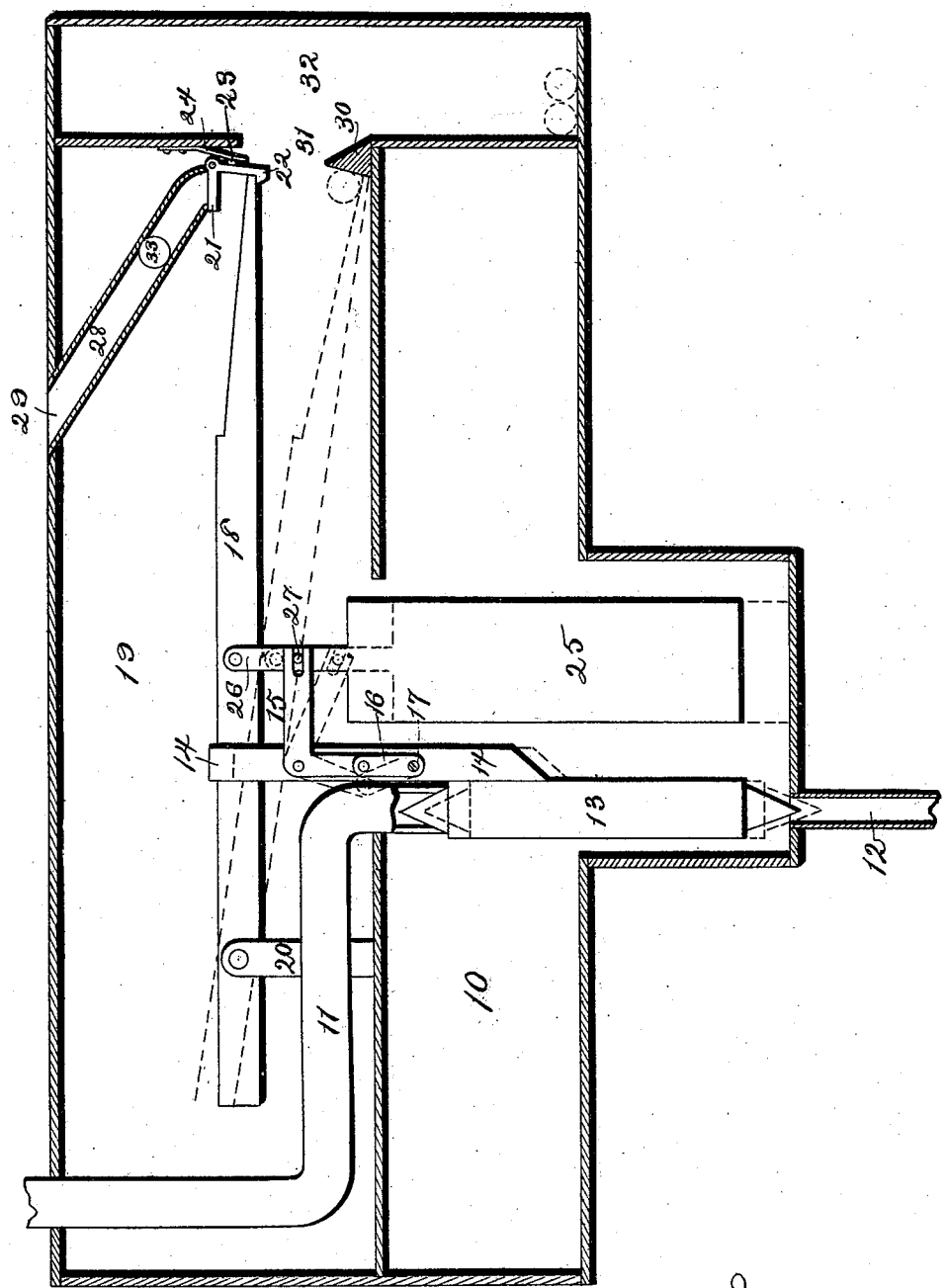

UNITED STATES PATENT OFFICE.

OLIVER B. ROSS, OF SPENCER, IOWA.

AUTOMATIC MEASURER FOR CREAMERIES.

SPECIFICATION forming part of Letters Patent No. 574,275, dated December 29, 1896.

Original application filed May 11, 1896, Serial No. 591,101. Divided and this application filed July 13, 1896. Serial No. 598,956. (No model.)

*To all whom it may concern:*

Be it known that I, OLIVER B. ROSS, a citizen of the United States of America, and a resident of Spencer, in the county of Clay and State of Iowa, have invented a new and useful Automatic Measurer for Creameries, of which the following is a specification.

This invention relates to improvements in means for measuring milk and should be read in connection with my invention described in an application for United States Letters Patent filed May 11, 1896, and serially numbered 591,101.

The object of this invention is to provide improved means whereby the patrons of a creamery or cheese-factory may receive the allotted amount due them of the whey or skim-milk resultant after the product has undergone the necessary treatment to extract therefrom the cheese material or cream without necessitating the measuring of the individual quantities by an attendant, and thus avoiding unequal distribution of the return products.

My invention consists in the combination of a receptacle provided with a depression or chamber arranged to receive milk or whey from a separator or cheese-machine and provided with inlet and outlet ports, valvularly controlled, a bell-crank lever fulcrumed on the valve and flexibly connected to the receptacle, a float extended within the depression or chamber of the receptacle and flexibly connected with the bell-crank lever which operates the float, a lever fulcrumed near one end within the receptacle and carrying the float at its center, and check-controlled tripping mechanism whereby the last-named lever may be released to permit the operation of the valve for the delivery of milk into the chamber or depression of the receptacle.

My invention consists, further, in the construction, arrangement, and combination of elements hereinafter set forth, pointed out in my claims, and illustrated by the accompanying drawing, in which the figure is a sectional elevation longitudinally of my machine.

In the construction of the apparatus, as shown, the numeral 10 designates a receptacle which is provided with an inlet-pipe 11, leading from a tank or separator, (not shown,) and an outlet-pipe 12, leading from the lower extremity of the tank 10, in alinement with the mouth of the inlet-pipe 11. A valve-plug 13 is vertically positioned in the space between the discharge-port of the inlet-pipe and the initial port of the outlet-pipe and is so shaped at its ends to close one or the other of said ports according to the elevation of said plug.
The valve-plug 13 is fixed to the lower end of a connecting-rod 14, which extends above the same and carries approximately at its center, or a little above its center, a bell-crank lever 15, fulcrumed thereon. The bell-crank lever 15 has an arm normally projecting in a horizontal plane laterally from the connecting-rod 14 and bifurcated at its extremity, and an arm normally extending downwardly from its fulcrum and pivotally connected at its lower extremity to the upper end of a link 16, which link is pivoted at its lower end on a stud 17, rigidly fixed in and projecting inwardly from the wall of the receptacle, which is omitted from the drawing.

A lever 18 is positioned horizontally above the receptacle 10 and within an inclosure 19, and said lever is fulcrumed on a standard 20, extending vertically from the top of the receptacle 10. The long arm of the lever extends to the extreme right of the inclosure 19 and is reduced or tapered. A trigger 21 of bell-crank form is fulcrumed adjacent to the right end of the inclosure 19 and is provided with a hook on the lower extremity of its downwardly-projecting arm, which hook is designated as 22 and engages beneath the tapered end of the lever 18 at times. A lug 23 is formed on the rear face of the downwardly-projecting arm of the bell-crank trigger 21 and is impinged against by a leaf-spring 24, mounted on the end of the inclosure. A float 25 is mounted in and vertically intersects the receptacle 10, extending from a plane near the bottom of said receptacle into the inclosure 19, and the upper end of said float is connected by a stem 26 to the central portion of the lever 18. The stem 26 carries, approximately at its center, a horizontally-projecting pin 27, which traverses the bifurcation in the extremity of the horizontal arm of the bell-crank lever 15. A raceway 28 is mounted in the upper portion of the inclosure 19 and leads from a port or slot 29 in the top of said inclosure obliquely rearwardly or to the right into proximity with the spring 24. The raceway 28 has an open end, which is closed at times partly by the horizontal arm of the trigger 21, which arm of the trigger 21 may be broadened approximately to the extent of the diameter or thickness of the raceway. A stop 30 is positioned on the top of one end of the receptacle 10 immediately below the trigger 21 and has an apex upper portion. Adjacent to the stop 30 an opening 31 is formed in the end wall of the inclosure 19, and located outside the end wall and communicated with by said slot is a check-receiver 32 of a height corresponding to the combined heights of the receptacle 10 and inclosure adjacent thereto.

In the operation of this machine the return products are put in communication with the inlet-pipe 11. The lever 18 is positioned, as shown in Fig. 1, in engagement with or by the hook 22 of the trigger. When the parts are in the position shown in Fig. 1, the valve-plug 13 closes the delivery-port of the inlet-pipe 11 and prevents the flow of the return products into the receptacle 10. The patron is furnished by the weigh-master of the creamery or cheese-factory with a number of checks, counters, or balls 33, corresponding in number with the number of units of measurement, determined by the capacity of the receptacle 10, to which he is entitled of the return products. The patron deposits a can or receptacle of portable character beneath the outlet-pipe 12 and places a check 33 through the port 29 into the raceway 28. The check travels along the raceway into forcible impact with the horizontal arm of the trigger 21 and oscillates said trigger, resulting in the release of the lever 18 from the hook 22 and the descent of said lever. Upon the descent of the lever into the position shown by dotted lines the stem 26 and float 25 descend, carrying the pin 27 downwardly. The pin 27 carries downwardly the outer end of the horizontal arm of the bell-crank lever 15, and thereby oscillates said lever. The lower end of the bell-crank lever 15 being retained against elevation by engagement pivotally with the link 16 it oscillates said link, and a descent of the lever 15 follows. In the descent of the lever 15 the connecting-rod 14 is depressed and carries with it the valve-plug 13 out of engagement with the delivery-port of the inlet-pipe 11 and into engagement with the initial port of the delivery-pipe 12. Upon the descent of the lever 18 the tapered end thereof occupies the position shown by dotted lines in Fig. 1 in close proximity to the stop 30, and the check 33 rests against the inclined inner face of said stop. The return products flow from the inlet-pipe 11 into the receptacle 10 and, filling said receptacle, elevates the float 25 and through said float and the stem 26 lifts the lever 18. When the lever 18 is lifted nearly to the top of the stop 30, the check 33 thereon travels over said stop and falls into the lower portion of the receiver 32. The pin 27 on the stem 26 lifts the bell-crank lever 15, connecting-rod 14, and valve-plug 13 until said valve-plug is reseated in the delivery-port of the inlet-pipe 11, and the outlet-pipe 12 is opened to permit the flow of milk, whey, or return products into the receptacle controlled by the patron. In the further elevation of the float 25, which occurs suddenly and really as one operation, the lever 18 is caused to engage with and pass the hook 22 and be engaged and retained thereby, and the bell-crank lever 15 is oscillated to perpendicularly position the link 16 and lock the valve-plug against accidental descent.

The machine is now in position for a repetition of the movements of operation heretofore described as required to utilize the number of checks or counters 33 possessed by the patron.

I claim as my invention—

1. The combination of a receptacle, ingress and egress ports to said receptacle, a valve controlling said ports alternately, a connecting-rod carrying said valve, a bell-crank lever fulcrumed on said rod and toggle-jointed to the receptacle, a lever fulcrumed above said receptacle and check-operated in one direction, and float mechanism connecting said bell-crank lever and the main lever to operate the valve in opposition to the check operation.

2. The combination of a receptacle provided with a depression or chamber arranged to receive milk or whey from a separator or cheese-machine and provided with inlet and outlet ports, a single valve controlling both of said ports, a bell-crank lever fulcrumed on the valve and flexibly connected to the receptacle, a float extended within the depression or chamber of the receptacle and flexibly connected to the bell-crank lever, a lever fulcrumed near one end within the receptacle, and carrying the float at its center, and check-controlled tripping mechanism whereby the last-named lever may be released to permit the operation of the valve for delivery of milk into the chamber or depression of the receptacle.

3. The combination of a receptacle, a chamber for milk communicating with said receptacle and having a depression or well in its bottom, a check-controlled lever mechanism mounted in the receptacle and extended within the chamber, whereby the flow of milk to and from said chamber is governed and a lesser chamber communicating with the receptacle adjacent to the path of travel of the checks by which the lever mechanism is controlled and designed to receive the used checks from the receptacle and a stop 30 arranged between the receptacle and lesser chamber whereby the checks temporarily are retained in advance of delivery into the lesser chamber.

OLIVER B. ROSS.

Witnesses:
GEO. GREAVES,
W. L. JAYNE.